June 17, 1947.     A. E. MELROSE     2,422,431
METHOD OF MAKING PISTON RINGS
Filed Feb. 28, 1944

INVENTOR.
ADOLPH E. MELROSE
BY
Earl D. Chappell
ATTYS.

Patented June 17, 1947

2,422,431

UNITED STATES PATENT OFFICE 2,422,431

METHOD OF MAKING PISTON RINGS

Adolph E. Melrose, Hastings, Mich., assignor to Hastings Manufacturing Company, Hastings, Mich.

Application February 28, 1944, Serial No. 524,311

5 Claims. (Cl. 51—290)

The main objects of this invention are:

First, to provide a piston ring of the split expansible type which is highly efficient in the initial installation and use thereof in maintaining an effective film of oil on the cylinder wall while preventing passage of oil.

Second, to provide a piston ring having a surface facilitating the effective wearing-in of the ring and at the same time a surface free from loose or easily detached metal particles.

Third, to provide a method of producing or manufacturing piston ring elements having these advantages which may be effectively practiced with comparatively simple means and which may be economically practiced on a large scale.

Fourth, to provide a method of manufacturing piston rings which results in producing a wall contacting surface comprising a multiplicity of small and closely spaced indentations adapted to constitute oil pockets during the initial wearing-in period and to facilitate the wearing-in of the rings, and also to provide a surface having these advantages which is free from loose or readily detached metal particles.

Fifth, to provide a method of manufacturing piston rings in which wall tension can be controlled through a substantial range in a simple and effective manner.

Objects pertaining to details and economies of the invention will definitely appear from the description to follow. The invention is defined in the claims.

A structure which is a preferred embodiment of the invention and means for carrying out the method of making are clearly illustrated in the accompanying drawing, in which.

Figure 5:
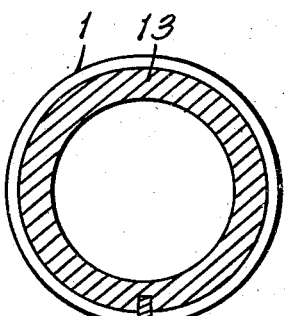
Fig. 5 is a view corresponding to that of Figs. 3 and 4 with the gap open to a position intermediate the closed position shown in Fig. 3 and the open position shown in Fig. 4.

In the accompanying drawing I have illustrated a piston ring 1 of the split inherently expansible type normally having a substantial gap when uncompressed, the ring as shown in Fig. 5 being in approximately its normal expanded position with sufficient gap to allow it to be compressed and inserted into a cylinder. The gap will vary as is common practice with the particular design of ring, that is, in degree of eccentricity, size and the like, which are well understood by those skilled in the art.

My improved ring 1 in the preferred embodiment is formed of cast iron and after the usual preliminary shaping, comprising the steps of so-called snagging and rough turning, is finished to provide a cylinder contacting surface designated 2 consisting of closely disposed indentations or pits. This surface is substantially uniform throughout the entire cylinder contacting area, and very satisfactory results have been obtained with such indentations or pits of a width or diameter of the order of .001 to .020 of an inch and of a depth of the order of .00025 to .003 of an inch. It will be understood, of course, that there is considerable variation in the width or diameter and the depth. The indentations or pits are closely spaced so that they constitute a continuous or unobstructed pitted or indented surface.

These pits or indentations constitute oil pockets during the initial wearing-in period and they provide a surface which is quite quickly worn in to the cylinder surface without injury such as scuffing, scoring, galling or seizing the cylinder surface. At the same time an effective seal against combustion pressures is provided, even from the initial use of the ring. It is my opinion that this results not only from the fact that quite a uniform surface is provided but also from the fact that the pockets or indentations effectively retain oil, thus providing a more effective seal against blow-by. They also prevent the passage of oil to the combustion chamber while maintaining a substantial film of oil on the cylinder wall. It is my view that the surface of the rings acts somewhat as a wick and wiper, causing a thin film of oil to be evenly distributed on the cylinder wall, and that this is an important factor as it insures sufficient lubrication to prevent scuffing, scoring, galling and seizing during the wearing-in period of the ring. Another factor is that the rings wear in quite quickly and uniformly.

I produce this surface by subjecting the peripheries of the rings to a blast of blasting grit particles, and I have effectively used blasting sand or blasting grits, metal grits so-called, and combinations of the two. These blasting grits are graded, the sand blasting grits being commonly from 30 to 120 grit while metal grit commonly ranges from 20 to 90. I have found metal grit to be highly desirable because commercial metal grits are usually more uniform in size than sand grits, last longer and have sharper cutting edges, producing more clearly defined indentations.

Figure 2:
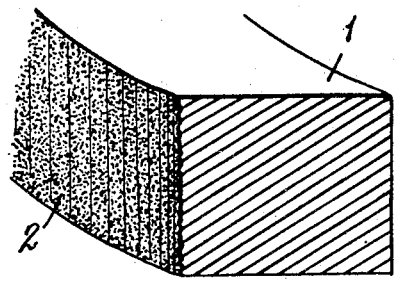
Fig. 2 is an enlarged fragmentary view of a piston ring embodying the invention and illustrating certain of the characteristics thereof, the illustration being conventionalized.
Figure 1:
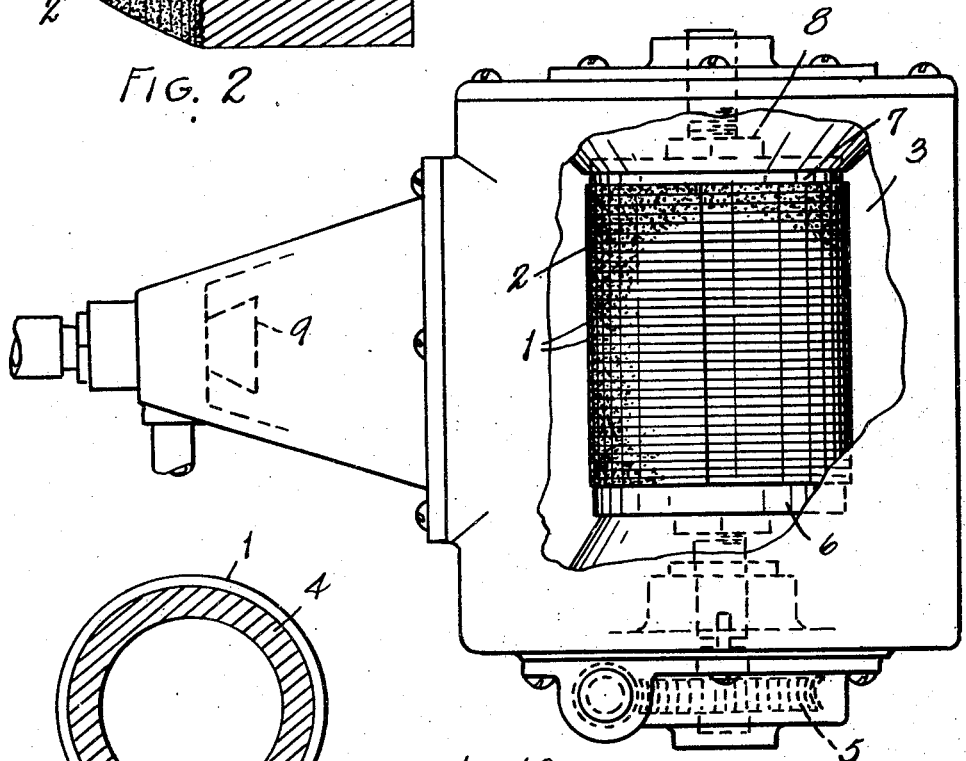
Fig. 1 is a fragmentary side elevation of an apparatus adapted for practicing the method and illustrating steps of the method, parts being shown conventionally.
Figure 3:
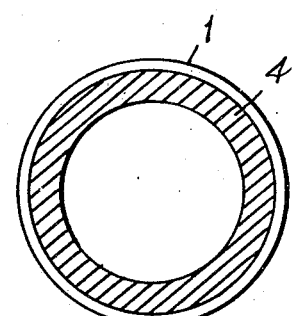
Fig. 3 is a cross section through a supporting mandrel illustrating a ring mounted thereon with the gap closed.

In Fig. 1 I illustrate an apparatus for practicing the method which consists of a blasting chamber 3 in which is rotatably mounted an arbor 4 driven, preferably slowly, from suitable gearing such as the worm gearing indicated at 5. The rings 1 are mounted on this arbor in side by side relation, being clamped between the head flange 6 and the opposed clamping flange 7 secured to the arbor by means of the nut 8. The blasting nozzle is indicated at 9.

In the embodiment shown in Fig. 1 the joint or gap 10 of the ring is closed and the rings are clamped upon the arbor in that closed position. The arbor or mandrel is rotated while the grit is blasted against the same until the cylinder contacting peripheral surface of the ring is made up of a multiplicity of closely adjacent indentations or pits. It is not practical to attempt to illustrate these in their dimensions in the drawing, but as pointed out they may desirably be approximately of the dimensions stated.

Another result of the method is that all loose or easily detached metal flakes and particles resulting from the snagging rough-turning operations are removed and the softer substances such as graphite, carbon deposits and the like are removed from the surface, leaving a surface comprised substantially of metal crystals. However, the indentations or pits are so minute that this surface is not harsh or rasping, particularly when operating in an internal combustion engine, as the surface holds a substantial amount of lubricant and is effective in spreading the lubricant in a thin film; at the same time it prevents objectionable passage of lubricant and is effective in preventing blow-by.

A still further and important feature or result of the method is that the blasting grit is discharged upon or impinges the surface of the ring with such force as to produce a substantial peening effect, strengthening the surface against torsional stress. When the ring is subjected to the blasting treatment while in a compressed state the inherent tension of the ring is reduced. If the ring is subjected to the blasting treatment with the gap open as indicated in Figs. 4 and 5, the tension of the ring is increased as compared to that of rings finished by the usual method of snagging, rough-finishing and grinding or machining, to produce substantially annular grooves in the surface as has been quite generally practiced in the art.

Figure 4:
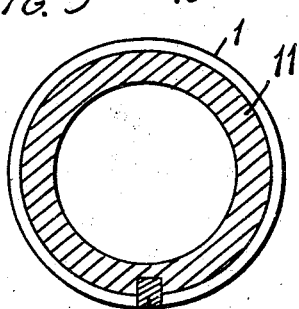
Fig. 4 is a cross sectional view corresponding to that of Fig. 3 illustrating rings mounted upon a mandrel with their gaps open.

In Fig. 4 the rings to be processed are mounted upon a mandrel 11 of suitable shape to receive them in expanded position, a spacing member 12 being arranged between the ends. This is left in position during the blasting step as it protects the mandrel and serves to keep the rings in proper position.

In Fig. 5 the mandrel 13 is appropriately shaped to receive and support the rings with their ends spaced by the spacer 14.

In using the term blasting it will be understood that I have in mind any means for impelling or impinging the particles against the surface of the rings with sufficient force to secure the indenting or pitting of the surface. The degree of the peening action may be varied considerably by the period of blasting and the force with which the blasting grit is delivered to the surface of the ring. Inasmuch as the cylinder contacting surface of the ring is materially reduced by this treatment the rings have a relatively high unit pressure on the cylinder wall during the initial wearing-in period, and this results not only in more effective sealing but in more rapid seating and wearing-in of the ring.

Rings produced by the method and embodying the features of this invention do not have an abrasive cylinder contacting surface and the surface may be described as having a somewhat velvety feel as distinguished from a polished surface or as compared to the intentionally roughened thread-like surface which is widely used in the finishing of piston rings.

I have illustrated and described my invention, both the ring structure and the method of producing the same, in an embodiment which I have found highly practical. I have not attempted to illustrate or describe other embodiments and adaptations as it is believed this disclosure will enable those skilled in the art to embody or adapt my invention as may be desired.

Having thus described my invention what I claim as new and desire to secure by Letters Patent is:

1. The method of treating split cast iron piston rings normally having a substantial gap when uncompressed comprising arranging a plurality of such rings in side by side relation upon a supporting mandrel, and subjecting the peripheries of the rings while so assembled and supported and while the mandrel is being rotated to a blast of blasting grit particles until a cylinder wall contacting peripheral surface results comprising closely disposed indentations covering substantially the entire surface, the width of such indentations being of the order of .001 to .020 of an inch and the depth of the order of .00025 to .003 of an inch, said rings being resiliently flexed from their normally opened gapped position to a gap opening of a predetermined size and held in such flexed position on said supporting mandrel during said blasting of the rings.

2. The method of treating split cast iron piston rings normally having a substantial gap when uncompressed comprising arranging a plurality of such rings in side by side relation upon a supporting mandrel, and subjecting the peripheries of the rings while so assembled and supported and while the mandrel is being rotated to a blast of blasting grit particles until a cylinder wall contacting peripheral surface results comprising closely disposed indentations covering substantially the entire surface, said rings being resiliently flexed from their normally opened gapped position to a gap opening of a predetermined size and held in such flexed position on said supporting mandrel during said blasting of the rings.

3. The method of treating split cast iron piston rings normally having a substantial gap when uncompressed comprising arranging a plurality of such rings in side by side relation upon a supporting mandrel with their gaps substantially closed, and subjecting the peripheries of the rings while so assembled and supported and while the mandrel is being rotated to a blast of blasting grit particles until a cylinder wall contacting peripheral surface results comprising closely disposed indentations covering substantially the entire surface, said rings being resiliently flexed from their normally opened gapped position to said substantially closed position and held in such flexed position on said supporting mandrel during said blasting of the rings.

4. The method of manufacturing piston ring elements comprising the steps of forming split cast iron ring elements having substantial inherent resilience and a substantial gap when uncompressed, and subjecting the cylinder wall contacting face of such elements while the gap of the elements is substantially closed to a bombardment of blasting grit particles with such impact as to produce a peening action and a wall contacting surface comprising a multiplicity of small and closely spaced indentations adapted to constitute oil pockets during the initial wearing-in period and to provide a wearing-in surface substantially free from loose metal particles, said ring elements being resiliently flexed from their normally opened gapped position to said substantially closed position and held in such flexed position during said blasting of the ring elements.

5. The method of manufacturing piston ring elements comprising the steps of forming split ring elements having substantial inherent resilience and a substantial gap when uncompressed, and subjecting the cylinder wall contacting face of such elements to a bombardment of blasting grit particles with such impact as to produce a peening action and a wall contacting surface comprising a multiplicity of small and closely spaced indentations adapted to constitute oil pockets during the initial wearing-in period and to provide a surface facilitating wearing in, said ring elements being resiliently flexed from their normally opened gapped position to a gap opening of a predetermined size and held in such flexed position during said blasting of the ring elements.

ADOLPH E. MELROSE.

REFERENCES CITED

The following references are of record in the file of this patent:

UNITED STATES PATENTS

| Number | Name | Date |
| --- | --- | --- |
| 1,116,776 | Wilcox | Nov. 10, 1914 |
| 1,074,675 | Wenzel | Oct. 7, 1913 |
| 1,241,836 | Dunham | Oct. 2, 1917 |
| 955,470 | Motz | Apr. 19, 1910 |
| 2,328,869 | Wilkie | Sept. 7, 1943 |
| 2,248,530 | Granger et al. | July 8, 1941 |
| 1,311,937 | Williams | Aug. 5, 1919 |
| 1,654,736 | Kistner | Jan. 3, 1928 |